(12) United States Patent
Seul et al.

(10) Patent No.: US 11,271,928 B2
(45) Date of Patent: Mar. 8, 2022

(54) BIOELECTRICAL AUTHENTICATION

(71) Applicant: International Business Machines Corporation, Armonk, NY (US)

(72) Inventors: Matthias Seul, Martinez, CA (US); Nicolo' Sgobba, Brno (CZ); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 16/363,171

(22) Filed: Mar. 25, 2019

(65) Prior Publication Data
US 2020/0314092 A1   Oct. 1, 2020

(51) Int. Cl.
*G06F 21/00* (2013.01)
*H04L 29/06* (2006.01)

(52) U.S. Cl.
CPC .............................. *H04L 63/0853* (2013.01)

(58) Field of Classification Search
CPC .................................................. H04L 63/0853
See application file for complete search history.

(56) References Cited

U.S. PATENT DOCUMENTS

| | | | |
|---|---|---|---|
| 9,055,101 B2 | 6/2015 | Kasslin et al. | |
| 2005/0281439 A1 | 12/2005 | Lange | |
| 2011/0227856 A1* | 9/2011 | Corroy | H04B 13/005 345/173 |
| 2016/0189134 A1 | 6/2016 | Voege et al. | |
| 2016/0189451 A1* | 6/2016 | Yoo | H04L 63/0861 340/5.82 |
| 2018/0096547 A1* | 4/2018 | Robertson | A61B 5/0028 |
| 2018/0206782 A1 | 7/2018 | Rojas Martinez et al. | |
| 2018/0225437 A1* | 8/2018 | Suh | H04W 12/0605 |
| 2018/0232589 A1 | 8/2018 | Woo et al. | |
| 2020/0169566 A1* | 5/2020 | Wolf | H04L 63/08 |
| 2020/0228524 A1* | 7/2020 | Szafranski | H04L 67/38 |

FOREIGN PATENT DOCUMENTS

| | | |
|---|---|---|
| EP | 1706852 B1 | 8/2008 |
| JP | WO2017077601 A1 | 8/2018 |
| WO | WO2018049851 A1 | 3/2018 |

(Continued)

OTHER PUBLICATIONS

Pal et al., "Evaluation of Bioelectric Signals for Human Recognition," International Conference on Intelligent Computing, Communication & Convergence, Procedia Computer Science, vol. 48, Dec. 2015, pp. 747-753.

(Continued)

*Primary Examiner* — Brandon S Hoffman
*Assistant Examiner* — William A Corum, Jr.
(74) *Attorney, Agent, or Firm* — Yee & Associates, P.C.

(57) ABSTRACT

User bioelectrical authentication is provided. A bioelectrical configuration signature of a user in physical contact with a hardware token is received, via a token reader, during a low range radio frequency user authentication process to permit a secure transaction by the user. The bioelectrical configuration signature of the user is utilized as part of the low range radio frequency user authentication process to authenticate the user to perform the secure transaction.

19 Claims, 7 Drawing Sheets

(56) References Cited

FOREIGN PATENT DOCUMENTS

WO    WO2018162482 A1    9/2018

OTHER PUBLICATIONS

Kibret et al., "Human Body as Antenna and its Effect on Human Body Communications," Progress in Electromagnetics Research, vol. 148, 2014, pp. 193-207. http://jpier.org/PIER/pier148/17.14061207.pdf.

Zhao et al., "A Review on Human Body Communication: Signal Propagation Model, Communication Performance, and Experimental Issues," Wireless Communications and Mobile Computing, Hindawi, Wireless Communications and Mobile Computing, vol. 2017, 16 pages. https://www.hindawi.com/journals/wcmc/2017/5842310/.

Park et al., "Introduction of Human Body Communication," Electronics and Telecommunications Research Institute Human Body Communication SoC Team, Jan. 15, 2008, 20 pages. https://mentor.ieee.org/802.15/dcn/08/15-08-0019-00-0006-introduction-of-human-body-communication.pdf.

Morris et al., Humantenna: Sensing Gestures Using the Body as an Antenna, Microsoft Research, copyright 2019, accessed Mar. 11, 2019, 3 pages. https://www.microsoft.com/en-us/research/project/humantenna-sensing-gestures-using-body-antenna/.

Dantest, "Bioelectrical Impedance Analysis (BIA) and Body Composition Analysis," Medeia Inc., Copyright 1988-2019, accessed Mar. 11, 2019, 13 pages. http://www.dantest.com/dtr_bioscan_bia.htm.

\* cited by examiner

FIG. 1

BIOELECTRICAL CONFIGURATION
FEATURE CHART
400

| USER BIOELECTRICAL CONFIGURATION FEATURES | MEASUREMENT EQUIPMENT |
|---|---|
| HEART | ELECTROCARDIOGRAPH (ECG) |
| MUSCLES | ELECTROMYOGRAPH (EMG) |
| SKIN | GALVANIC SKIN RESPONSE (GSR) MACHINE |
| BRAIN | ELECTROENCEPHALOGRAPH (EEG) |
| EYES | ELECTROOCULOGRAPH (EOG) |

BIOELECTRICAL AUTHENTICATION

BACKGROUND

1. Field

The disclosure relates generally to user authentication and more specifically to authenticating a user based on a digital signal of a hardware token corresponding to the user that is signed by a unique bioelectrical configuration signature of the user.

2. Description of the Related Art

User authentication is a critical component of security. For example, authenticating a user's identity is a first step in providing control for performing secure transactions or accessing secure resources by the user. Authentication means confirming the user's identity, while authorization means granting permission to the user. In other words, authentication is the process of verifying who the user is, while authorization is the process of verifying what the user can perform or have access to. Logically, authentication precedes authorization.

However, security experts argue that it is impossible to prove the identity of a user with absolute certainty. It is only possible to apply one or more tests which, if passed, is sufficient for a user to proceed. The problem is determining which tests are sufficient, and many such tests are inadequate. For example, many current tests can be passed or spoofed by unauthorized users one way or another, with varying degrees of difficulty.

SUMMARY

According to one illustrative embodiment, a computer-implemented method for user bioelectrical authentication is provided. A bioelectrical configuration signature of a user in physical contact with a hardware token is received, via a token reader, during a low range radio frequency user authentication process to permit a secure transaction by the user. The bioelectrical configuration signature of the user is utilized as part of the low range radio frequency user authentication process to authenticate the user to perform the secure transaction. According to other illustrative embodiments, a computer system and computer program product for user bioelectrical authentication are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
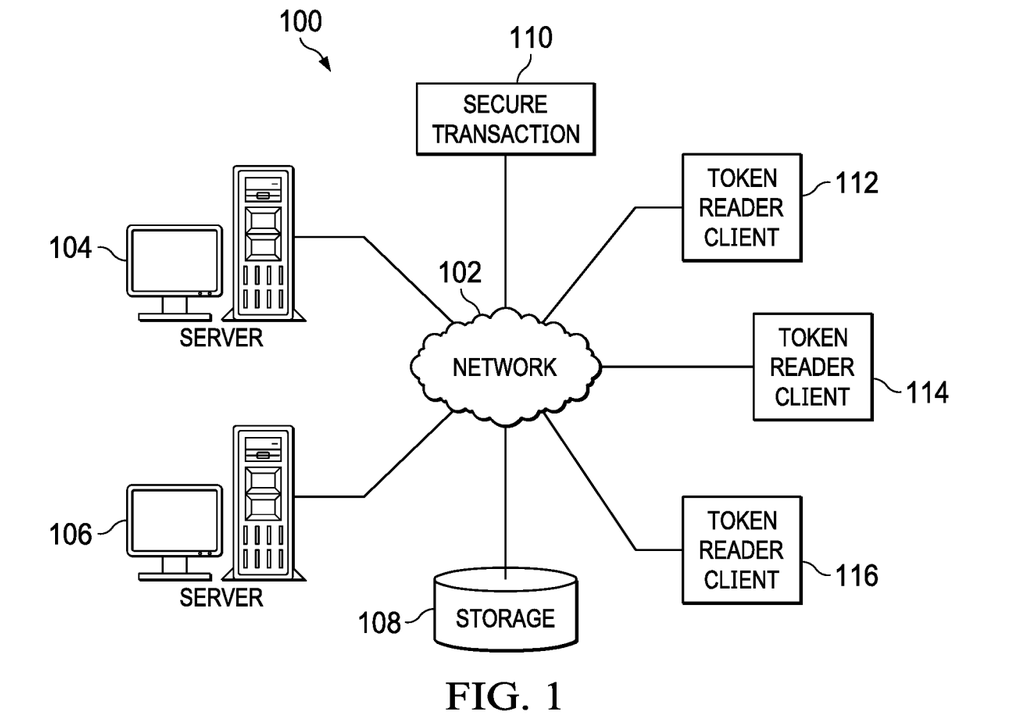
FIG. 1 is a pictorial representation of a network of data processing systems in which illustrative embodiments may be implemented.
Figure 2:
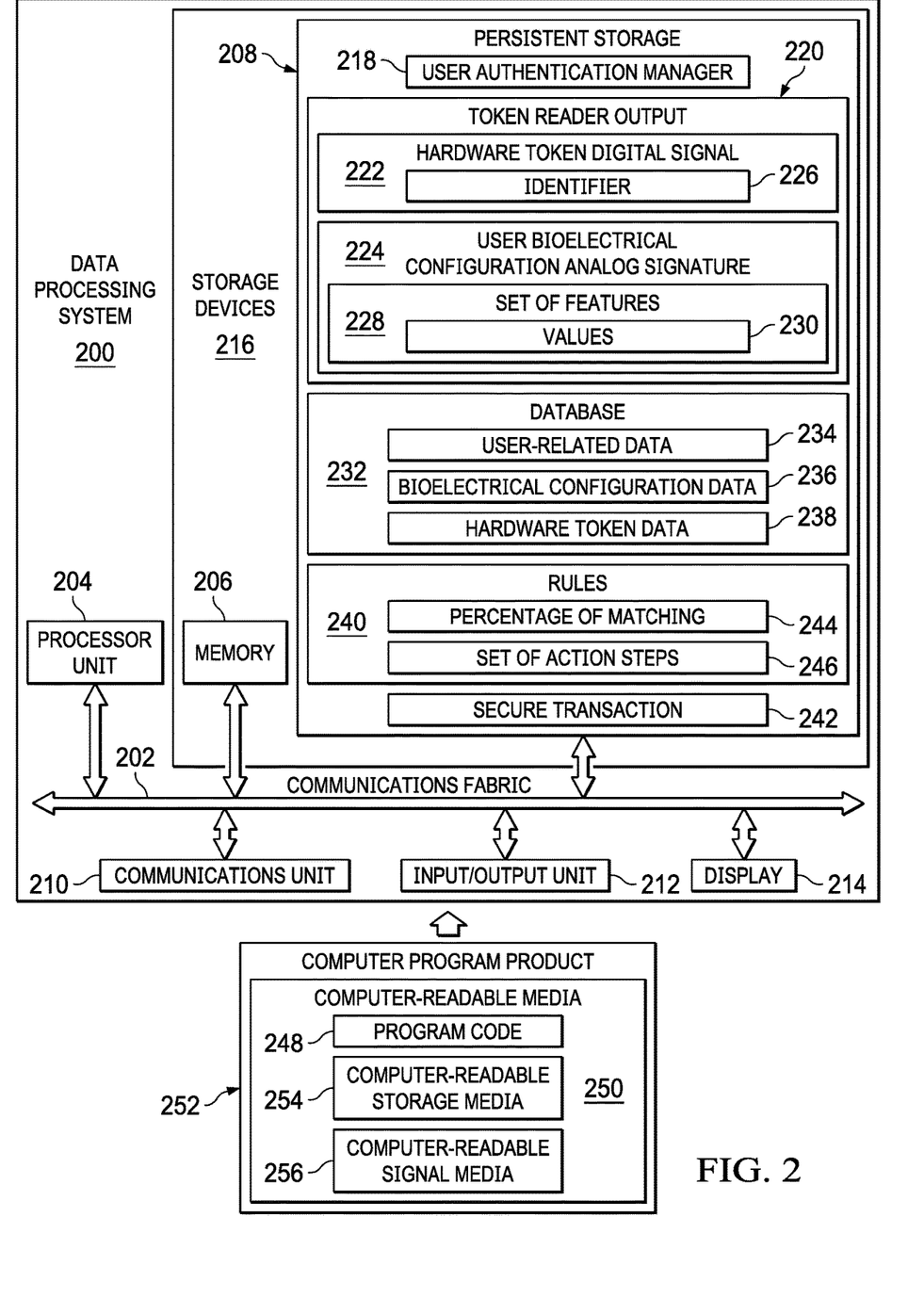
FIG. 2 is a diagram of a data processing system in which illustrative embodiments may be implemented.
Figure 3:
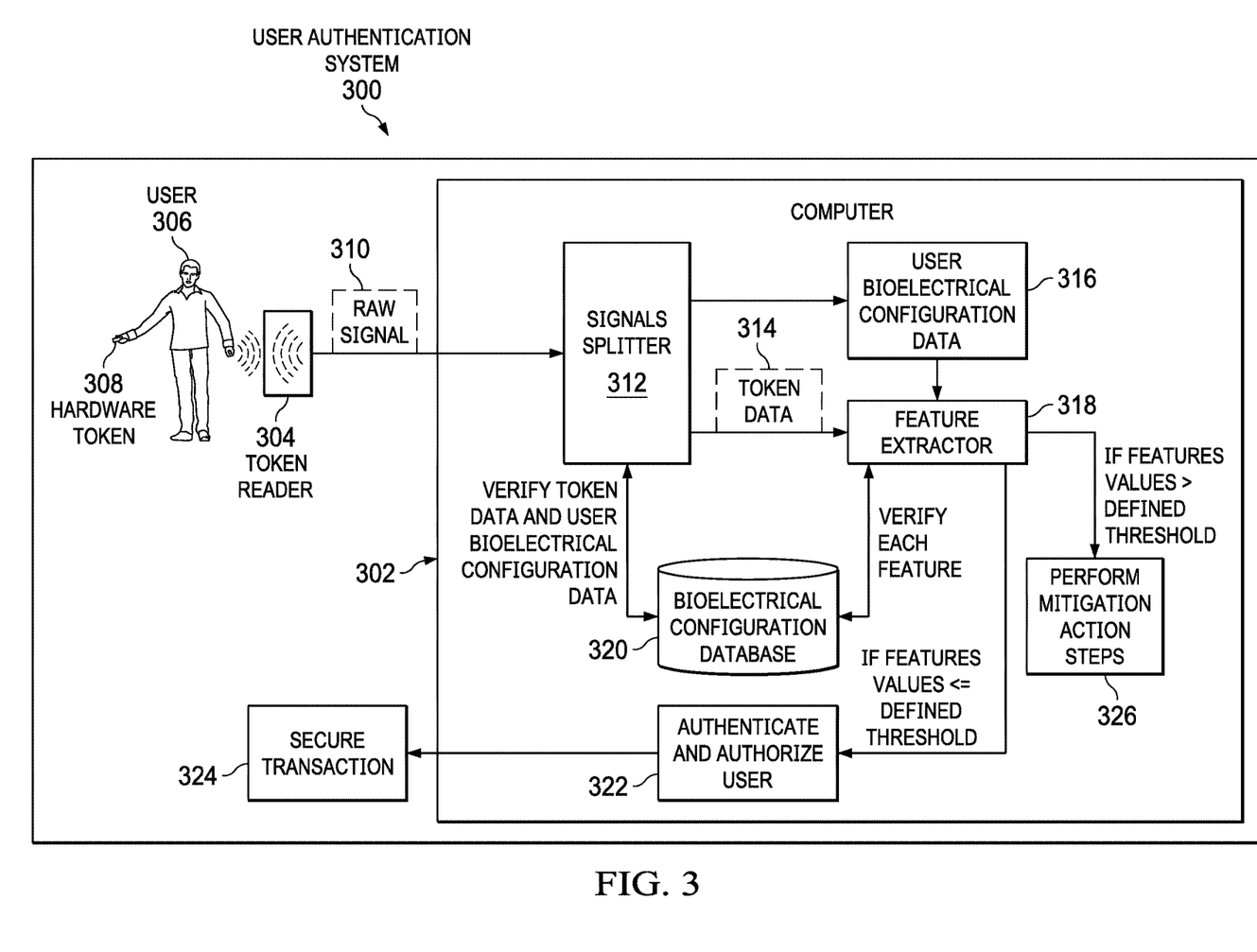
FIG. 3 is a diagram illustrating an example of a user authentication system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a security service, such as user bioelectrical authentication, prior to permitting users of hardware tokens to perform a secure transaction, such as secure transaction 110. Hardware tokens may include, for example, different types of smart phones, smart cards, security fobs, and the like. In other words, a hardware token is any physical device or container that can emit a low range radio frequency signal used for user identification. Low range may be, for example, 1-30 centimeters. Secure transaction 110 may represent any type of secure transaction, such as, for example, performing a financial transaction, accessing sensitive information, accessing a secure hardware device, accessing a secure application, unlocking a security door to a secure location, and the like. Further, secure transaction 110 may represent a plurality of different types of secure transactions. Also, it should be noted that server 104 and server 106 may represent clusters of servers in a data center. Alternatively, server 104 and server 106 may represent computing nodes in a cloud environment that provides user bioelectrical authentication services.

Client 112, client 114, and client 116 also connect to network 102. Clients 112, 114, and 116 are token readers and clients of server 104 and server 106. Token reader clients 110, 112, and 114 may represent a plurality of different types of token readers that are capable of reading a plurality of different types of hardware tokens. A user of a hardware token may present the hardware token to one of token reader clients 110, 112, or 114 prior to performing secure transaction 110.

Storage 108 is a network storage device capable of storing any type of data in a structured format or an unstructured format. In addition, storage 108 may represent a plurality of network storage devices. Further, storage 108 may store identifiers and network addresses for a plurality of different servers, identifiers and network addresses for a plurality of different token reader client devices, identifiers for a plurality of different hardware token users and other user-related data, bioelectrical configuration signature data corresponding to each respective hardware token user, identifiers for each respective hardware token of each respective hardware token user, and the like. Furthermore, storage 108 may store other types of data, such as authentication or credential data that may include user names, passwords, and biometric data associated with hardware token users, security analysts, and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to token reader client 110 over network 102 for use on token reader client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores user authentication manager 218. However, it should be noted that even though user authentication manager 218 is illustrated as residing in persistent storage 208, in an alternative illustrative embodiment user authentication manager 218 may be a separate component of data processing system 200. For example, user authentication manager 218 may be a hardware component coupled to communication fabric 202 or a combination of hardware and software components.

User authentication manager 218 controls the process of authenticating a user based on a digital signal of a hardware token corresponding to the user being signed by a unique bioelectrical configuration signature of the user. Token reader output 220 represents an output of a token reader, such as, for example, token reader client 112 in FIG. 1, after a user in physical contact with a hardware token, such as a security fob, by a first portion of the user's body (e.g., held in user's right hand) presents a second portion of the user's body (e.g., user's left hand) to the token reader. The hardware token in physical contact with the first portion of the user's body is beyond a reading range of the token reader to directly read the digital data contained within the hardware token. Thus, the user's body is acting as a signal transmission medium to transmit a signal of the digital data, such as hardware token digital signal 222, from the hardware token to the token reader. As hardware token digital signal 222 travels through the user's body, the user's body uniquely transforms hardware token digital signal 222. The unique transformation of hardware token digital signal 222 by the user's body forms the bioelectrical configuration signature of the user, such as user bioelectrical configuration analog signature 224. Illustrative embodiments include both hardware token digital signal 222 and user bioelectrical configuration analog signature 224 in token reader output 220.

Hardware token digital signal 222 includes identifier 226. Identifier 226 uniquely identifies the hardware token of the user. User bioelectrical configuration analog signature 224 represents the unique way that the body of the user transforms or distorts a hardware token digital signal traversing the user's body. User bioelectrical configuration analog signature 224 includes set of features 228. Set of features 228 represents a set of one or more features of the user's body that generate bioelectrical signals, such as, for example, the user's heart, muscles, skin, brain, eyes, and the like, and play a part in transforming and distorting hardware token digital signal 222 as it travels through the user's body. Set of features 228 includes values 230. Values 230 represent characteristics or properties of set of features 228 corresponding to user bioelectrical configuration analog signature 224, such as, for example, amplitude, frequency, jitter, distortions, and the like.

Database 232 represents a storage area for previously recorded data. In this example, database 232 contains user-related data 234, bioelectrical configuration data 236, and hardware token data 238. User-related data 234 represent information corresponding to a plurality of different users. User-related data 234 may include, for example, user name, unique user identifier, user date of birth, and the like, for each respective user listed in database 232. Bioelectrical configuration data 236 represent previously collected bioelectrical configuration signatures corresponding to each respective user. Hardware token data 238 represent information corresponding to a plurality of different hardware tokens associated with the plurality of different users. Hardware token data 238 may include, for example, hardware token type and unique identifier, such as a serial number, for each respective hardware token. It should be noted that each hardware token identifier corresponds to a particular user and that user's unique bioelectrical configuration signature. User authentication manager 218 utilizes the data contained in database 232 to compare with the information contained in token reader output 220 to authenticate a particular user.

User authentication manager 218 utilizes rules 240 to determine whether to allow a user to perform a particular secure transaction, such as secure transaction 242. Secure transaction 242 may be, for example, a financial transaction, secure document access, secure computer access, security door access, and the like. Rules 240 include percentage of matching 244. Percentage of matching 244 represents a level, amount, or degree of matching between features of a received user bioelectrical configuration signature contained in a token reader output and features of a corresponding stored user bioelectrical configuration signature contained in database 232. Rules 240 also include set of action steps 246. Each action step in set of action steps 246 corresponds to a particular percentage of user bioelectrical configuration signature feature matching. For example, if user authentication manager 218 determines that the percentage of feature matching between a received user bioelectrical configuration signature and a stored user bioelectrical configuration signature is less than a first defined percentage threshold level, such as, for example, 60 percent, then user authentication manager 218 may prevent or block the user from performing secure transaction 242. Similarly, if user authentication manager 218 determines that the percentage of feature matching between the received user bioelectrical configuration signature and the stored user bioelectrical configuration signature is between the first defined percentage threshold level and a second defined percentage threshold level, such as, for example, 80 percent, then user authentication manager 218 may permit the user to perform secure transaction 242 with restriction and trigger a security alert. If user authentication manager 218 determines that the percentage of feature matching between the received user bioelectrical configuration signature and the stored user bioelectrical configuration signature is greater than the second defined percentage threshold level, then user authentication manager 218 may permit the user to perform secure transaction 242 without restriction.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Current standards for low range radio frequency identification technologies, such as, for example, near field communication (NFC), radio frequency identification (RFID), and the like, leave any kind of advanced protection like data encryption or user passwords up to whoever is utilizing low range radio frequency identification. In addition, more advanced security features for low range radio frequency identification are up to the developers or technology implementors. However, this presents a problem when a user needs to exchange sensitive data (e.g., transaction payment information). As a result, a need exists for improved security for data transmission based on low range radio frequency identification technologies.

Currently, a user presents a low range radio frequency identification hardware token, such as, for example, a smart phone, a smart identification card, a security fob, and the like, to a token reader. As used herein, a hardware token is any physical device or container that can emit a low range radio frequency, which is used for user identification. Low range may be, for example, from 1 centimeter to 30 centimeters. In other words, the low range radio frequency identification hardware token is only able to be used or be effective over short distances from a token reader. The token reader reads the information stored on the token and triggers an appropriate action. If a security mechanism is implemented in this current scenario, then the security mechanism is typically implemented in the transaction confirmation process and relies on some alphanumeric string that is to be verified within a defined amount of time after a transaction is initiated (e.g., user enters a personal identification number (PIN) to confirm the transaction at a point of sale (POS) device). However, the transmission of the transaction data is not secure, which introduces user risk that the transaction data may be stolen or altered.

Illustrative embodiments increase data transmission security via low range radio frequency identification (e.g., NFC, RFID, and the like) using a human user's unique bioelectrical configuration (i.e., a set of one or more user bioelectrical features, such as heart, muscles, skin, brain, eyes, and the like and their respective feature values) to sign or authenticate a secure transaction (e.g., a secure financial transaction, secure data exchange, accessing a secure location, accessing a secure device, and the like). Illustrative embodiments utilize a combination of user bioelectrical configuration analog data and low range radio frequency identification hardware token digital data for user authentication and authorization. Illustrative embodiments maintain a bioelectrical configuration database that stores bioelectrical configuration data for a plurality of registered users. The bioelectrical configuration database contains, for example: information, such as name, unique identifier, birthdate, and the like, related to each respective user, where each respective user is a hardware token owner; an identifiable and exclusive bioelectrical configuration corresponding to each respective user that is a hardware token owner; and a unique hardware token identifier associated with each respective identifiable and exclusive bioelectrical configuration corresponding to each respective user.

To increase security of secure transactions based on low range radio frequency identification technologies, illustrative embodiments leverage a user's unique bioelectrical configuration as a means of authentication and authorization by utilizing a low range radio frequency identification hardware token, a user of the hardware token, and a hardware token reader. Different from prior solutions, where a user is holding an NFC or RFID token directly in front of the token reader, illustrative embodiments utilize the body of the user as a transmission medium for signal propagation. For example, the user may hold the hardware token in the user's left hand such that the hardware token is in contact with the user's skin (in an alternative illustrative embodiment, the hardware token may be a ring worn on a finger or a bracelet worn on a wrist or ankle of the user, for example). The user then presents another part of the user's body, such as, for example, the user's right hand, in front of the token reader. This is analogous to a human holding a radio antenna to improve radio signal reception. In this case, the human body, itself, is working as a signal conductor and acts as an extension of the radio antenna.

Illustrative embodiments utilize the user's body as an antenna (i.e., signal propagation medium) for the low range radio frequency identification hardware token. As the digital signal of the hardware token travels through the user's body, the digital signal is distinctively transformed or distorted by the body's unique composition and make up. Illustrative embodiments use this distinct digital signal distortion as a unique bioelectrical configuration signature of the user. Illustrative embodiments sign the digital signal of the low range radio frequency identification hardware token using the unique bioelectrical configuration signature of the user. As a result, that hardware token cannot be used by anyone other than the user corresponding to the unique bioelectrical configuration signature that signed the hardware token's digital data. Thus, illustrative embodiments provide a new and advanced security feature, layer, or factor to low range radio frequency identification hardware tokens.

In general, a user's bioelectrical configuration is influenced or impacted by any or all of the bioelectrical signals of the user's body. These bioelectrical signals are typically very small in amplitude and require some pre-processing (e.g., amplification, attenuation, isolation, multiplexing, filtering, excitation, cold-junction compensation, and the like). Then, illustrative embodiments, via computer software, can accurately record, display, and analyze these bioelectrical signals. The user's body generates these bioelectrical signals by highly complex and dynamic biological processes that have continuously varying parameters and may often be hidden in a background of other signals and noise components.

This new and advanced security layer to low range radio frequency identification hardware tokens by adding the user's unique bioelectrical configuration signature on the hardware token's digital data may also be made dependent on the conductivity of that particular user's body condition, such as increased stress level, illness, rapid weight gain or loss, emotional state, activity level, and the like. Illustrative embodiments perform a set of preliminary steps such as user bioelectrical configuration data collection and storage for later comparison to authenticate a user. It should be noted that a human acting as an antenna or signal propagation medium is intended to work with analog signals. However, low range radio frequency identification technologies work with digital signals.

Consequently, illustrative embodiments convert all user bioelectrical analog signals into digital or numerical value representations via an analog-to-digital conversion process. After illustrative embodiments convert the user bioelectrical analog signals into digital value representations, illustrative embodiments can process, manipulate, and operate on the digital representations of the user bioelectrical signals via a variety of processes to generate new data or make various determinations, as well as store in computer memory. During a user registration process, illustrative embodiments perform a series of measurements on a set of one or more bioelectrical signals, individually and multiple times, using a set of bioelectrical measuring devices, such an electrocardiograph, electromyograph, electroencephalograph, electrooculograph, galvanic skin response machine, and the like. Illustrative embodiments then convert these bioelectrical analog signal measurements corresponding to a user to digital value representations via the analog-to-digital conversion process. Illustrative embodiments utilize these digital value representations to generate a unique bioelectrical configuration signature for the user.

Illustrative embodiments sign the digital data of the low range radio frequency identification hardware token corresponding to the user using the unique bioelectrical configuration signature of the user. Illustrative embodiments utilize the signed digital data of the low range radio frequency identification hardware token to authenticate the user. Illustrative embodiments compare currently received bioelectrical configuration data and hardware token data corresponding to a user with stored bioelectrical configuration data and hardware token data corresponding to the user to determine whether a match exists. If illustrative embodiments determine that a match does exist between the currently received and stored bioelectrical configuration data and hardware token data, then illustrative embodiments authenticate the user and authorize the user to perform a secure transaction, such as, for example, complete a financial transaction, release electronic locks of a secure door, unlock a secure device, or the like. If illustrative embodiments determine that a match does not exist between the currently received and stored bioelectrical configuration data and hardware token data, then illustrative embodiments do not authenticate the user and perform a set of mitigation action steps. The set of mitigation action steps may include, for example, illustrative embodiments sending a security alert notification to security personnel. Further, illustrative embodiments may block or cancel the secure transaction that the user is currently trying to perform. Alternatively, illustrative embodiments may allow the user to perform the secure transaction with restriction (e.g., by providing verifiable additional security information, such as password or biometric sample) or with security personnel presence or assistance.

Illustrative embodiments store user data, bioelectrical configuration data, and low range radio frequency identification hardware token data in a bioelectrical configuration database. To store all this information, illustrative embodiments dimension the bioelectrical configuration database to store hundreds of thousands of tuples, along with their related bioelectrical feature values. Following this data model, illustrative embodiments define a data lifecycle for data persistence from creation to disposal. For example, illustrative embodiments may create and store data in the bioelectrical configuration database by manual input and may modify or update the data per user feedback. Illustrative embodiments may perform data disposal by manual input or user request.

Thus, illustrative embodiments provide one or more technical solutions that overcome a technical problem with hardware token user authentication. As a result, these one or more technical solutions provide a technical effect and a practical application in the field of user authentication.

With reference now to FIG. 3, a diagram illustrating an example of a user authentication system is depicted in accordance with an illustrative embodiment. User authentication system 300 may be implemented in a network of data processing systems, such as network data processing system 100 in FIG. 1. User authentication system 300 is a system of hardware and software components for authenticating a user based on a digital signal of a hardware token corresponding to the user being signed by a unique bioelectrical configuration signature of the user.

In this example, user authentication system 300 includes computer 302, token reader 304, user 306, and hardware token 308. Computer 302 may be, for example, server 104 in FIG. 1 or data processing system 200 in FIG. 2, and is part of a user authentication security system. Token reader 304 may be, for example, token reader client 112 in FIG. 1.

In this example, user 306 holds hardware token 308 in user 306's right hand, while presenting user 306's left hand to token reader 304. In other words, user 306 is utilizing user 306's body as a transmission medium to transmit a digital signal of hardware token 308 to token reader 304 instead of directly presenting hardware token 308 to token reader 304. As a result, user 306's body uniquely transforms or distorts the digital signal of hardware token 308 to form a unique bioelectrical configuration signature of the user.

Token reader 304 sends raw signal 310 to computer 302. Raw signal 310 contains the digital signal of hardware token 308 and user 306's unique bioelectrical configuration signature. Upon receiving raw signal 310, computer 302 utilizes signals splitter 312 to separate token data 314 from user bioelectrical configuration data 316. Then, computer 302 utilizes feature extractor 318 to isolate or obtain a set of one or more features and their related values corresponding to user bioelectrical configuration data 316.

Computer 302 compares the extracted set of features and their related values to a previously stored set of features and their related values corresponding to user 306 contained in bioelectrical configuration database 320. Bioelectrical configuration database 320 may be, for example, storage 108 in FIG. 1 or database 232 in FIG. 2. Further, computer 302 compares token data 314 with previously stored token data corresponding to token 308, which corresponds to user 306, contained in bioelectrical configuration database 320. Computer 302 performs the comparison process to verify that token data 314 and user bioelectrical configuration data 316 received in raw signal 310 are valid.

If computer 302 determines that feature value matching during the comparison process is within a defined threshold, then computer 302 authenticates and authorizes user 306 at 322. Moreover, computer 302 permits user 306 to perform secure transaction 324. Secure transaction 324 may be, for example, secure transaction 110 in FIG. 1 or secure transaction 242 in FIG. 2. If computer 302 determines that feature value matching during the comparison process is outside the defined threshold, then computer 302 performs a set of one or more mitigation action steps at 326. The set of mitigation action steps may include, for example, blocking user 306 from performing secure transaction 324 and/or sending a security alert to security personnel for further action.

Figure 4:
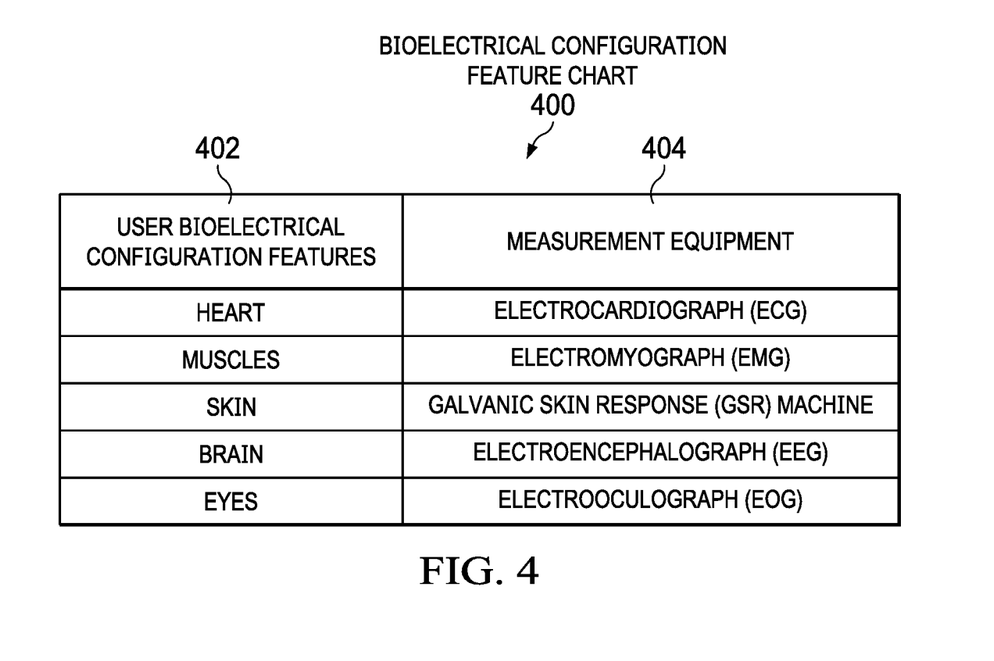
FIG. 4 illustrates an example of a bioelectrical configuration feature chart in accordance with an illustrative embodiment.

With reference now to FIG. 4, an example of a bioelectrical configuration feature chart is illustrated in accordance with an illustrative embodiment. Bioelectrical configuration feature chart 400 includes user bioelectrical configuration features 402 and measurement equipment 404. User bioelectrical configuration features 402 list some of the possible user's body parts that generate bioelectrical signals and measurement equipment 404 lists corresponding equipment needed to perform the feature value measurements.

In this example, user bioelectrical configuration features 402 include heart, muscles, skin, brain, and eyes of a user, such as user 306 in FIG. 3. Measurement equipment 404 includes an electrocardiograph for the heart, an electromyograph for the muscles, a galvanic skin response machine for the skin, an electroencephalograph for the brain, and an electrooculography for the eyes. Measurement equipment 404 collect and record the respective feature values of each particular feature in user bioelectrical configuration features 402, which correspond to the user. This recorded feature value data is stored in a database, such as bioelectrical configuration database 320 in FIG. 3, for future reference.

Figure 5:
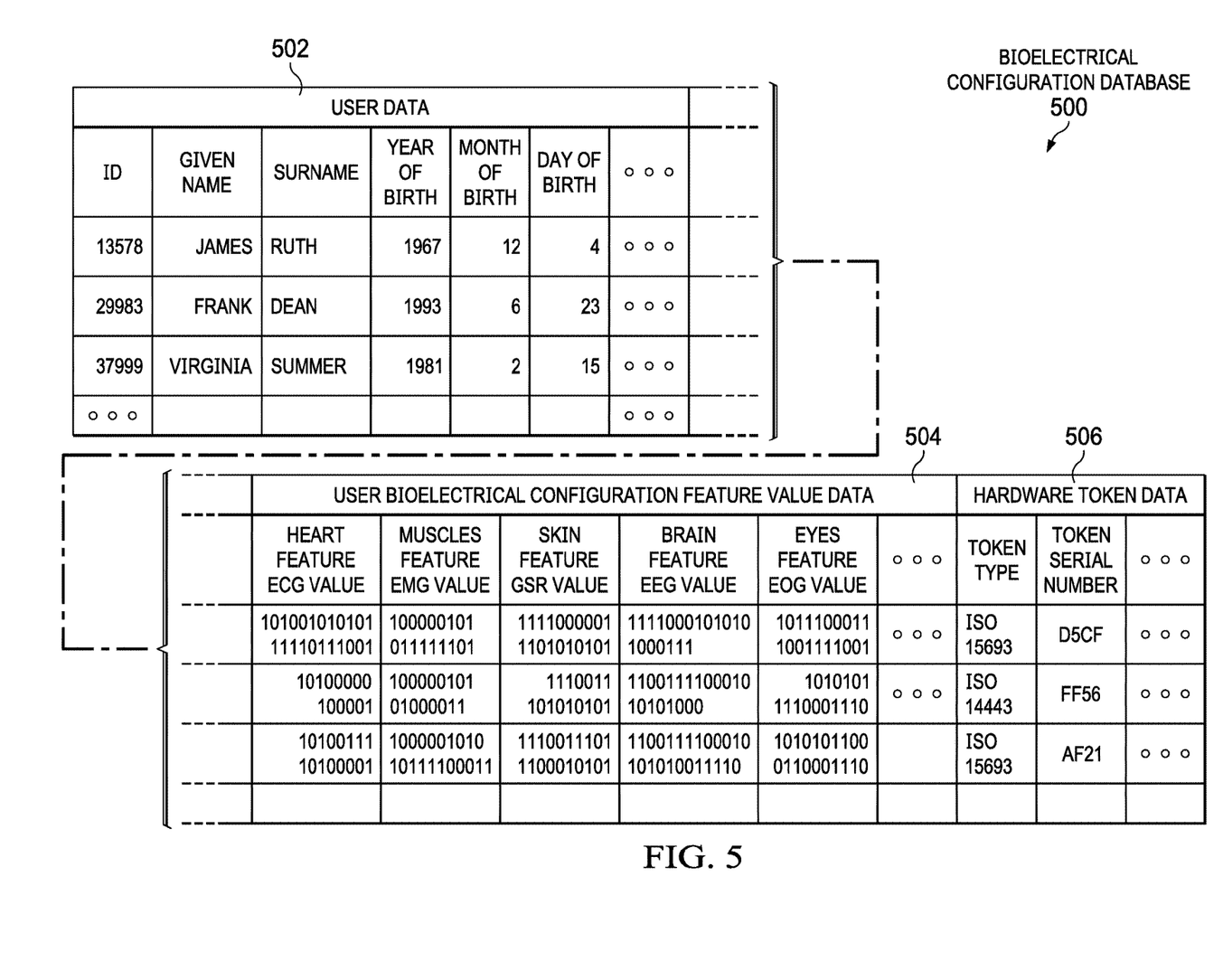
FIG. 5 illustrates an example of a bioelectrical configuration database in accordance with an illustrative embodiment.

With reference now to FIG. 5, an example of a bioelectrical configuration database is illustrated in accordance with an illustrative embodiment. Bioelectrical configuration database 500 may be, for example, bioelectrical configuration database 320 in FIG. 3. In this example, bioelectrical configuration database 500 includes user data 502, user bioelectrical configuration feature value data 504, and hardware token data 506. However, it should be noted that bioelectrical configuration database 500 is only meant as an example and not as a limitation on different illustrative embodiments. In other words, bioelectrical configuration database 500 may include other information not shown and may not include all information that is shown in this example.

In this example, user data 502 include identifier, given name, surname, year of birth, month of birth, and day of birth for each user in a plurality of different users. User bioelectrical configuration feature value data 504 include heart feature, muscles feature, skin feature, brain feature, and eyes feature, along with the corresponding feature values, for each respective user. Hardware token data 506 include token type and token serial number corresponding to each respective user.

Figure 6:
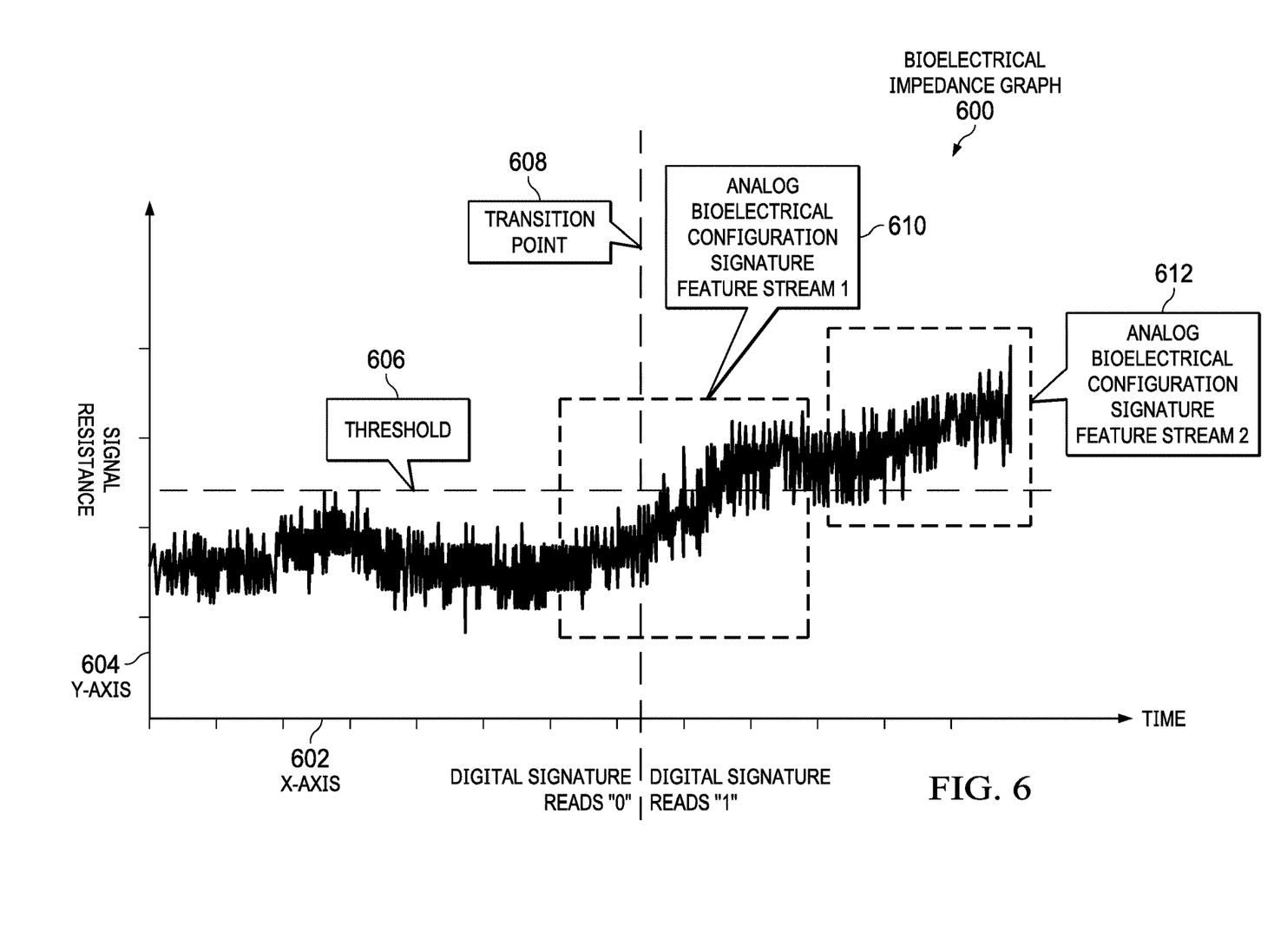
FIG. 6 illustrates an example of a bioelectrical impedance graph in accordance with an illustrative embodiment.

With reference now to FIG. 6, an example of a bioelectrical impedance graph is illustrated in accordance with an illustrative embodiment. Bioelectrical impedance graph 600 includes x-axis 602 and y-axis 604. X-axis 606 represents time and y-axis 604 represents signal resistance. Bioelectrical impedance graph 600 also includes threshold 606 and transition point 608. Threshold 606 represents a predefined signal resistance threshold level. Transition point 608 represents a point in time when a digital signature reading zero below threshold 606 changes or switches to a digital signature reading one above threshold 606. Analog bioelectrical configuration signature feature stream one 610 represents a feature value stream for one feature of a user's body and analog bioelectrical configuration signature feature stream two 612 represents another feature value stream for a second feature of the user's body.

Figure 7:
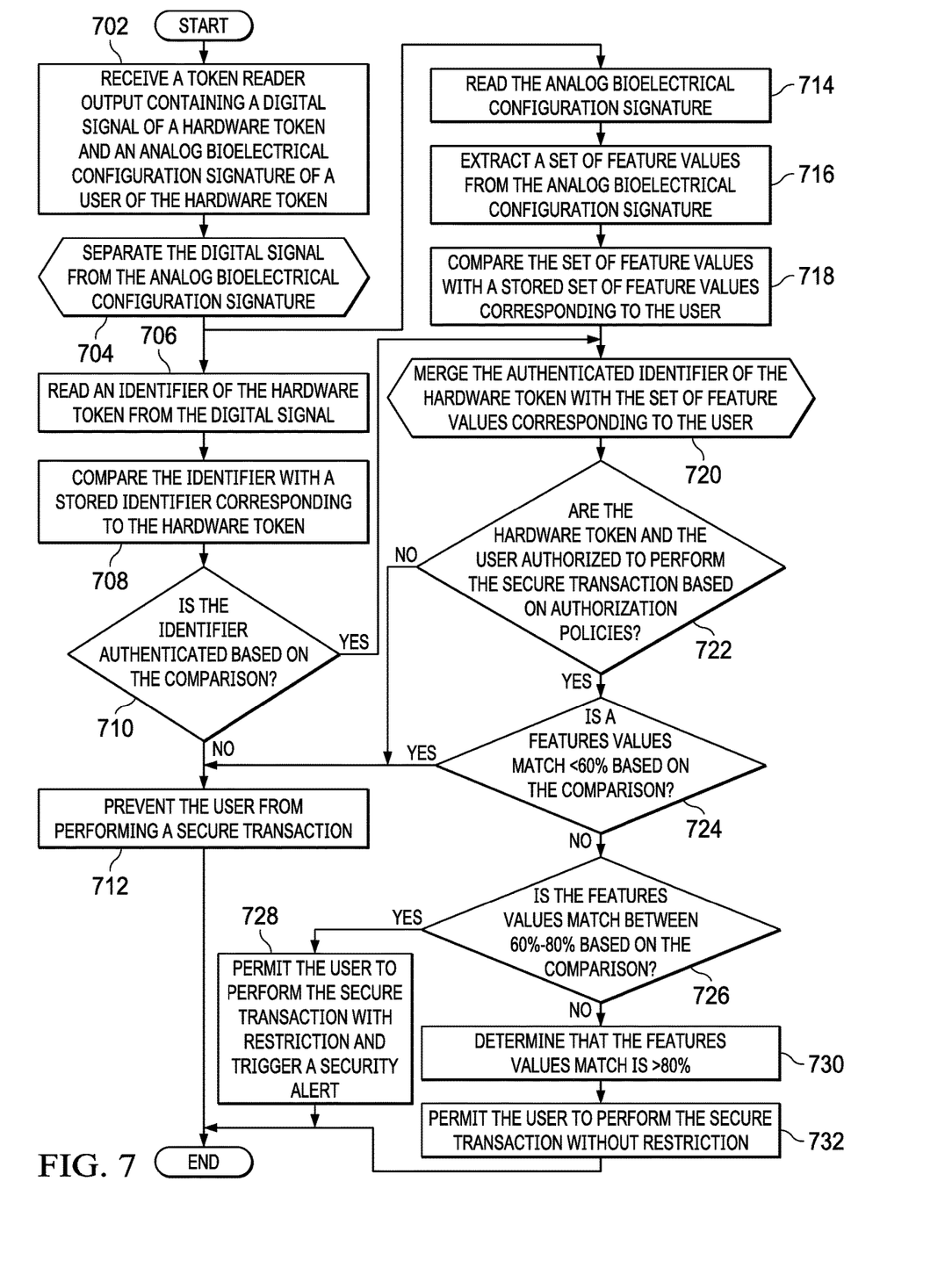
FIG. 7 is a flowchart illustrating a process for determining whether to permit a user to perform a secure transaction in accordance with an illustrative embodiment.

With reference now to FIG. 7, a flowchart illustrating a process for determining whether to permit a user to perform a secure transaction is shown in accordance with an illustrative embodiment. The process shown in FIG. 7 may be implemented in a computer, such as, for example, server 104 in FIG. 1, data processing system 200 in FIG. 2, or computer 302 in FIG. 3.

The process begins when the computer receives a token reader output containing a digital signal of a hardware token and an analog bioelectrical configuration signature of a user of the hardware token (step 702). The computer separates the digital signal from the analog bioelectrical configuration signature (step 704). In addition, the computer reads an identifier of the hardware token from the digital signal (step 706).

The computer compares the read identifier with a stored identifier corresponding to the hardware token (step 708). Further, the computer makes a determination as to whether the read identifier is authenticated based on the comparison (step 710). If the computer determines that the read identifier is not authenticated based on the comparison, no output of step 710, then the computer prevents the user from performing a secure transaction (step 712) and the process terminates thereafter. If the computer determines that the read identifier is authenticated based on the comparison, yes output of step 710, then the process proceeds to step 720.

It should be noted that the computer may perform steps 706-710 in parallel with steps 714-718. In other words, in addition to reading the identifier of the hardware token in step 706 after separating the digital signal from the analog bioelectrical configuration signature in step 704, the computer also reads the analog bioelectrical configuration signature (step 714). Furthermore, the computer extracts a set of one or more feature values from the analog bioelectrical configuration signature (step 716).

The computer compares the extracted set of one or more feature values with a stored set of feature values corresponding to the user (step 718). Moreover, the computer merges the authenticated identifier of the hardware token with the extracted set of one or more feature values corresponding to the user (step 720). The computer makes a determination as to whether the hardware token and the user are authorized to perform the secure transaction based on defined authorization policies (step 722).

If the computer determines that the hardware token and the user are not authorized to perform the secure transaction based on the defined authorization policies, no output of step 722, then the process returns to step 712 where the computer prevents the user from performing the secure transaction. If the computer determines that the hardware token and the user are authorized to perform the secure transaction based on the defined authorization policies, yes output of step 722, then the computer makes a determination as to whether a features values match is less than 60 percent based on the comparison of the extracted set of one or more feature values with the stored set of feature values (step 724). If the computer determines that the features values match is less than 60 percent based on the comparison of the extracted set of one or more feature values with the stored set of feature values, yes output of step 724, then the process returns to step 712 where the computer prevents the user from performing the secure transaction.

If the computer determines that the features values match is greater than 60 percent based on the comparison of the extracted set of one or more feature values with the stored set of feature values, no output of step 724, then the computer makes a determination as to whether the features values match is between 60 percent and 80 percent based on the comparison of the extracted set of one or more feature values with the stored set of feature values (step 726). If the computer determines that the features values match is between 60 percent and 80 percent based on the comparison of the extracted set of one or more feature values with the stored set of feature values, yes output of step 726, then the computer permits the user to perform the secure transaction with restriction and triggers a security alert (step 728). The restriction may be, for example, that the computer only permits the user to perform a low-risk transaction and not a medium-risk or high-risk transaction. The security alert may, for example, prompt security personnel to monitor the user while performing the secure transaction. Thereafter, the process terminates.

If the computer determines that the features values match is not between 60 percent and 80 percent based on the comparison of the extracted set of one or more feature values with the stored set of feature values, no output of step 726, then the computer determines that the features values match is greater than 80 percent (step 730) and permits the user to perform the secure transaction without restriction (step 732). Thereafter, the process terminates.

Figure 8:
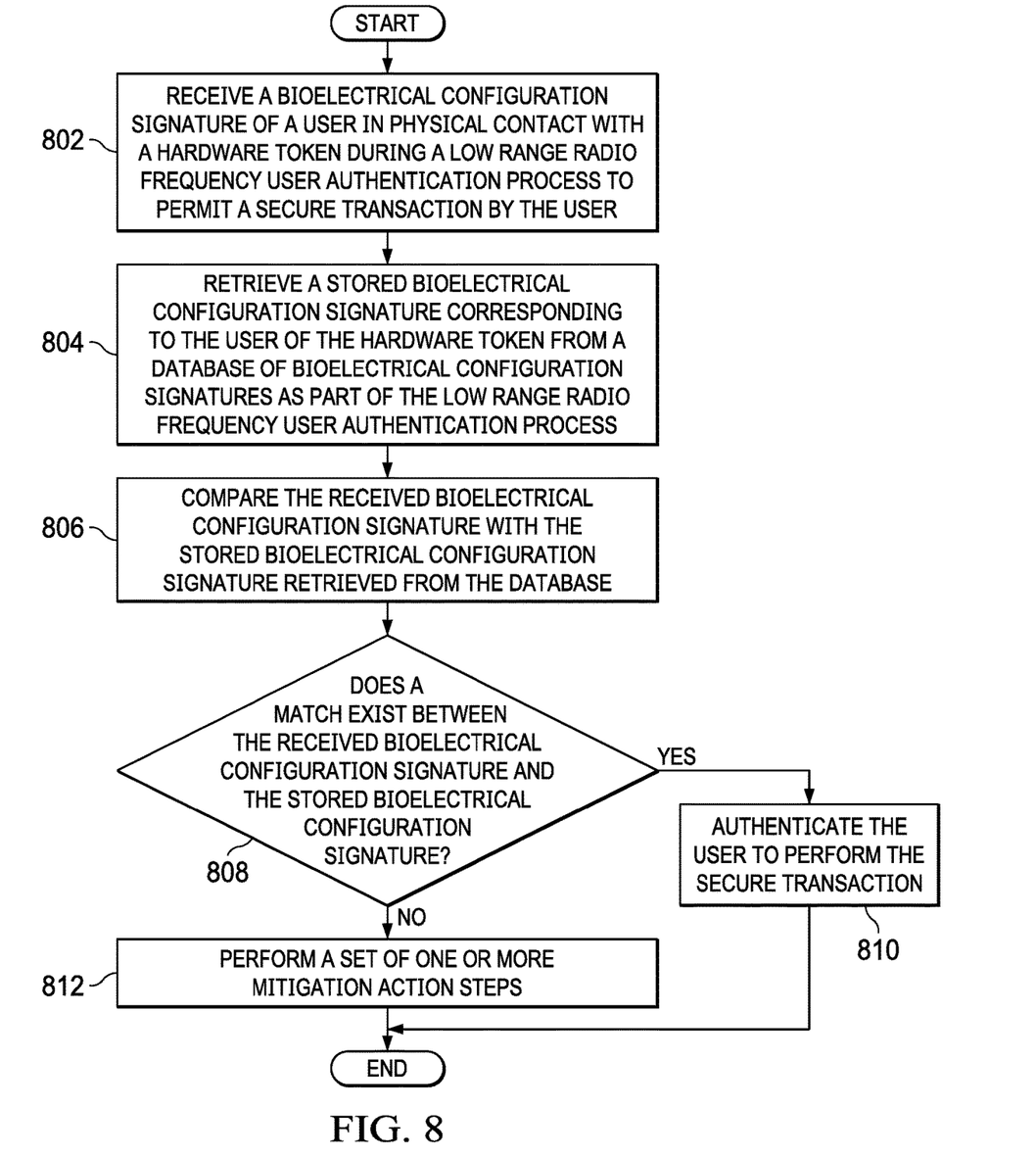
FIG. 8 is a flowchart illustrating a process for user bioelectrical authentication in accordance with an illustrative embodiment.

With reference now to FIG. 8, a flowchart illustrating a process for user bioelectrical authentication is shown in accordance with an illustrative embodiment. The process shown in FIG. 8 may be implemented in a computer, such as, for example, server 104 in FIG. 1, data processing system 200 in FIG. 2, or computer 302 in FIG. 3.

The process begins when the computer, via a token reader, receives a bioelectrical configuration signature of a user in physical contact with a hardware token during a low range radio frequency user authentication process to permit a secure transaction by the user (step 802). The computer utilizes the unique bioelectrical configuration signature of the user as part of the low range radio frequency user authentication process to authenticate and authorize the user to perform the secure transaction. During the low range radio frequency user authentication process, the user presents one portion or area of the user's body (e.g., the user's left hand) to the token reader while another portion or area of the user's body (e.g., the user's right hand) is in physical contact with the hardware token beyond a range of the token reader to read the digital data contained within the hardware token. Thus, the user's body transmits and uniquely transforms or distorts the digital data signal of the hardware token as it travels through the user's body to form the bioelectrical configuration signature of the user.

The computer retrieves a stored bioelectrical configuration signature corresponding to the user of the hardware token from a database of bioelectrical configuration signatures as part of the low range radio frequency user authentication process (step 804). The bioelectrical configuration signature database contains user-related data corresponding to a plurality of different users and each user is associated with a particular hardware token, unique bioelectrical configuration signatures corresponding to each respective user, and a hardware token identifier corresponding to each unique bioelectrical configuration signature of each respective user. In addition, the computer compares the received bioelectrical configuration signature with the stored bioelectrical configuration signature retrieved from the database (step 806).

Further, the computer makes a determination as to whether a match exists between the received bioelectrical configuration signature and the stored bioelectrical configuration signature (step 808). If the computer determines that a match does exist between the received bioelectrical configuration signature and the stored bioelectrical configuration signature, yes output of step 808, then the computer authenticates and authorizes the user to perform the secure transaction (step 810) and the process terminates thereafter. If the computer determines that a match does not exist between the received bioelectrical configuration signature and the stored bioelectrical configuration signature, no output of step 808, then the computer performs a set of one or more mitigation action steps (step 812). The set of mitigation action steps may include, for example, preventing the user from performing the secure transaction, allowing the user to perform the secure transaction with restrictions, sending an alert notification to security personnel for further action, and the like. Thereafter, the process terminates.

Thus, illustrative embodiments of the present invention provide a computer-implemented method, computer system, and computer program product for authenticating a user based on a digital signal of a hardware token corresponding to the user that is signed by a unique bioelectrical configuration signature of the user. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for user bioelectrical authentication, the computer-implemented method comprising:

receiving, via a token reader, a bioelectrical configuration signature of a user in physical contact with a hardware token during a low range radio frequency user authentication process to permit a secure transaction by the user; and utilizing the bioelectrical configuration signature of the user as part of the low range radio frequency user authentication process to authenticate the user to perform the secure transaction;

receiving a token reader output containing a digital signal of the hardware token and the bioelectrical configuration signature of the user;

reading an identifier of the hardware token from the digital signal;

comparing the identifier with a stored identifier corresponding to the hardware token;

determining whether the identifier is authenticated based on comparing the identifier with the stored identifier;

retrieving a stored bioelectrical configuration signature corresponding to the user of the hardware token from a database of bioelectrical configuration signatures as part of the low range radio frequency user authentication process;

comparing the received bioelectrical configuration signature with the stored bioelectrical configuration signature retrieved from the database; and determining whether a match exists between the received bioelectrical configuration signature and the stored bioelectrical configuration signature.

2. The computer-implemented method of claim 1 wherein the hardware token is a physical object held in a hand of the user that emits a low range radio frequency from one (1) to thirty (30) centimeters.

3. The computer-implemented method of claim 1 further comprising:

responsive to determining that a match does exist between the received bioelectrical configuration signature and the stored bioelectrical configuration signature, authenticating the user to perform the secure transaction, wherein determining whether the match exists between the received bioelectrical configuration signature and the stored bioelectrical configuration signature is performed based on a rule that specifies a percentage of matching that represents at least one of a level, amount and degree of matching between features of the received bioelectrical configuration signature contained in the token reader output and features of a corresponding stored user bioelectrical configuration signature contained in the database.

4. The computer-implemented method of claim 1 further comprising:

responsive to determining that a match does not exist between the received bioelectrical configuration signature and the stored bioelectrical configuration signature, performing a set of mitigation action steps.

5. The computer-implemented method of claim 1, wherein the database of bioelectrical configuration signatures contains user-related data corresponding to a plurality of different users and each user is associated with a particular hardware token, unique bioelectrical configuration signatures corresponding to each respective user, and a hardware token identifier corresponding to each unique bioelectrical configuration signature of each respective user.

6. The computer-implemented method of claim 1 further comprising:

responsive to receiving the token reader output from the token reader, separating the digital signal of the hardware token from the bioelectrical configuration signature of the user.

7. The computer-implemented method of claim 1 further comprising:

responsive to determining that the identifier is not authenticated based on comparing the identifier with the stored identifier, preventing the user from performing the secure transaction.

8. The computer-implemented method of claim 1 further comprising:

responsive to determining that the identifier is authenticated based on comparing the identifier with the stored identifier, merging the identifier of the hardware token with an extracted set of feature values extracted from the bioelectrical configuration signature corresponding to the user.

9. The computer-implemented method of claim 1 further comprising:

reading the bioelectrical configuration signature of the user;

extracting a set of feature values from the bioelectrical configuration signature of the user; and comparing the set of feature values with a stored set of feature values corresponding to the user.

10. The computer-implemented method of claim 9 further comprising:

determining whether a features values match is less than a first defined threshold percentage based on comparing the set of feature values with the stored set of feature values corresponding to the user; and responsive to determining that the features values match is less than the first defined threshold percentage based on the comparing of the set of feature values with the stored set of feature values, preventing the user from performing the secure transaction.

11. The computer-implemented method of claim 10 further comprising:

determining whether the features values match is between the first defined threshold percentage and a second defined threshold percentage based on comparing the set of feature values with the stored set of feature values corresponding to the user; and responsive to determining that the features values match is between the first defined threshold percentage and the second defined threshold percentage based on the comparing of the set of feature values with the stored set of feature values, permitting the user to perform the secure transaction with restriction and triggering a security alert.

12. The computer-implemented method of claim 11 further comprising:

determining whether the features values match is greater than the second defined threshold percentage based on the comparing of the set of feature values with the stored set of feature values corresponding to the user; and responsive to determining that the features values match is greater than the second defined threshold percentage based on the comparing of the set of feature values with the stored set of feature values, permitting the user to perform the secure transaction without restriction.

13. The computer-implemented method of claim 1, wherein the user presents a first portion of a body of the user to the token reader without physical contact of the first portion to the token reader, while a second portion of the body of the user is in physical contact with the hardware token, the hardware token in physical contact with the second portion of the body is beyond a range of the token reader to read digital data contained within the hardware token directly during the low range radio frequency user authentication process.

14. The computer-implemented method of claim 13, wherein the body of the user transmits and uniquely transforms a signal of the digital data from the hardware token as it travels through the body to form the bioelectrical configuration signature of the user.

15. The computer-implemented method of claim 13, wherein the low range radio frequency user authentication process is selected from a group consisting of near field communication and radio frequency identification.

16. The computer-implemented method of claim 13, wherein the hardware token is selected from a group consisting of a smart phone, a smart card, and a security fob.

17. A computer system for user bioelectrical authentication, the computer system comprising:

a bus system;

a storage device connected to the bus system, wherein the storage device stores program instructions; and a processor connected to the bus system, wherein the processor executes the program instructions to:

receive, via a token reader, a bioelectrical configuration signature of a user in physical contact with a hardware token during a low range radio frequency user authentication process to permit a secure transaction by the user;

utilize the bioelectrical configuration signature of the user as part of the low range radio frequency user authentication process to authenticate the user to perform the secure transaction;

receive a token reader output containing a digital signal of the hardware token and the bioelectrical configuration signature of the user;

read an identifier of the hardware token from the digital signal;

compare the identifier with a stored identifier corresponding to the hardware token;

determine whether the identifier is authenticated based on comparing the identifier with the stored identifier;

retrieve a stored bioelectrical configuration signature corresponding to the user of the hardware token from a database of bioelectrical configuration signatures as part of the low range radio frequency user authentication process;

compare the received bioelectrical configuration signature with the stored bioelectrical configuration signature retrieved from the database; and determine whether a match exists between the received bioelectrical configuration signature and the stored bioelectrical configuration signature.

18. A computer program product for user bioelectrical authentication, the computer program product comprising a computer readable storage medium having program instructions embodied therewith, the program instructions executable by a computer to cause the computer to perform a method comprising:

receiving, via a token reader, a bioelectrical configuration signature of a user in physical contact with a hardware token during a low range radio frequency user authentication process to permit a secure transaction by the user;

utilizing the bioelectrical configuration signature of the user as part of the low range radio frequency user authentication process to authenticate the user to perform the secure transaction;

receiving a token reader output containing a digital signal of the hardware token and the bioelectrical configuration signature of the user;

reading an identifier of the hardware token from the digital signal;

comparing the identifier with a stored identifier corresponding to the hardware token;

determining whether the identifier is authenticated based on comparing the identifier with the stored identifier;

retrieving a stored bioelectrical configuration signature corresponding to the user of the hardware token from a database of bioelectrical configuration signatures as part of the low range radio frequency user authentication process;

comparing the received bioelectrical configuration signature with the stored bioelectrical configuration signature retrieved from the database; and determining whether a match exists between the received bioelectrical configuration signature and the stored bioelectrical configuration signature.

19. The computer program product of claim 18 wherein the hardware token is a physical object held in a hand of the user that emits a low range radio frequency from one (1) to thirty (30) centimeters.

\* \* \* \* \*